Oct. 2, 1934.   F. L. STALEY   1,975,593
LUBRICATING DEVICE
Filed Feb. 23, 1933

Inventor
Frank L. Staley

By Rockwell & Bartholow
Attorneys

Patented Oct. 2, 1934

1,975,593

UNITED STATES PATENT OFFICE 1,975,593

LUBRICATING DEVICE

Frank L. Staley, Branford, Conn., assignor to Etta F. Dow, Branford, Conn.

Application February 23, 1933, Serial No. 658,052

8 Claims. (Cl. 121—2)

This invention relates to lubricating devices and more particularly to a lubricating device for use with, and as applied to, locomotive bells and mechanically operated bell ringers. Locomotive bells are now being operated by various devices among which are some which are operated by air pressure to swing the bell and thereby ring it. These devices are in general use and substantially replace the hand operated bell cord on all modern types of locomotives.

Considerable difficulty has been experienced in attempting to properly lubricate the belt ringing device and the trunnions upon which the bell swings, especially due to the positioning of the bell upon the top of the locomotive boiler adjacent the smokestack. Manual oiling of these parts has been found to be somewhat dangerous. Being oiled only at the terminals of the line, these parts due to oil evaporation and to cinders and other foreign material collecting in the oil openings and binding the bearings, many times become inoperative between the terminals. This results in the possibility of the bell not ringing when required and should an accident occur due to the omission of such warnings, considerable damage and possible loss of life might result.

In order to insure that the bell is operative at all times and to eliminate the necessity of hand oiling, the device shown and described herein has been devised and applied to such use.

One of the objects of this invention is to provide a lubricating device that will insure efficient lubrication of bearings and trunnions, such as the bearings and trunnions of a locomotive bell.

Another object is to provide such a device that will also substantially prevent entrance or collection of foreign material in the bearings through the oil opening therein.

A further object is to provide a lubricating system whereby a pressure operated bell-ringing device may be efficiently lubricated and the bearings and trunnions of the bell, or the like, operated thereby, will be lubricated and maintained free from foreign material.

A still further object is to provide a lubricating system for mechanical devices that will be efficient in use, inexpensive to manufacture and apply and substantially simple in structure.

To these and other ends the invention consists in the novel features and combinations of parts to be hereinafter described and claimed.

Figure 5:
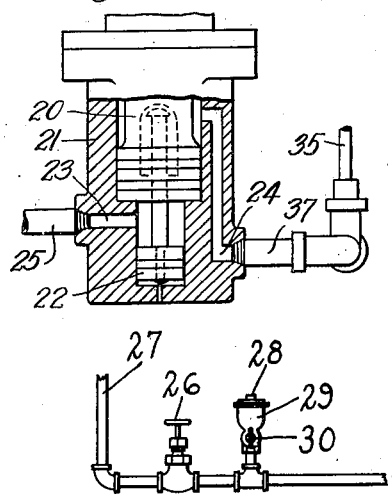
Fig. 5 is a sectional view through a piston and cylinder mechanism suitable for use to operate the bell.
Figure 1:
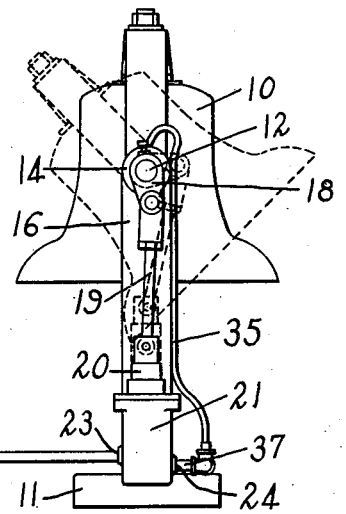
Fig. 1 illustrates my improved lubricating device applied to a swingable pressure-operated locomotive bell.
Figure 2:
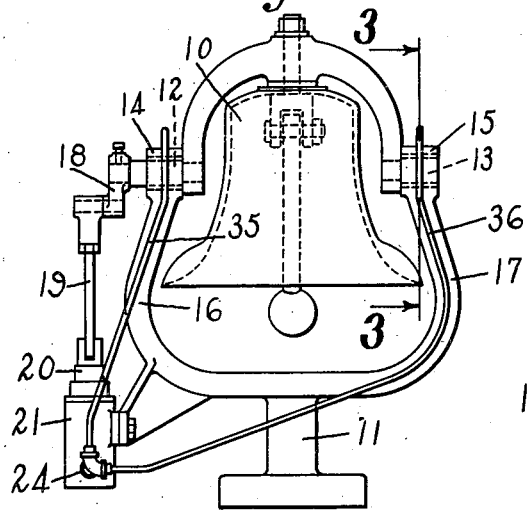
Fig. 2 is a front view of the same.
Figure 3:
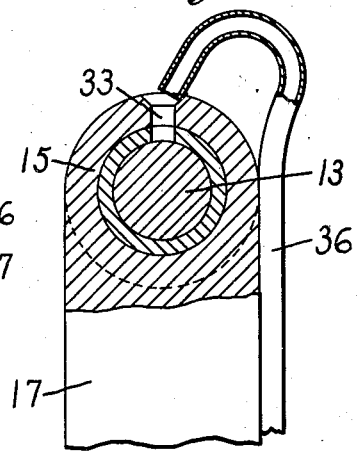
Fig. 3 is a section on lines 3—3 of Fig. 2.

While my invention is primarily a lubricating system or device and is illustrated as being applied to a locomotive bell-ringing device, I do not wish to be limited to such use or application as other uses and applications are possible. In addition to acting as a lubricating device, it is also useful in preventing entrance or collection of foreign material such as dust, cinders, etc. into open oil holes and bearings and may be applied to any such bearing and be operative whenever a fluid pressure supply, such as either steam or air under pressure, is available.

In the present instance, a locomotive bell 10 is supported on a frame 11, by trunnions 12 and 13 journaled in bearings 14 and 15 respectively, and which are provided in the arms 16 and 17 of frame 11. The frame 11 is generally mounted upon the top of a locomotive boiler, in many instances adjacent the smokestack. The trunnion 12 is extended beyond bearing 14 and a crank 18 is secured thereto. One end of a connecting rod 19 is secured to the crank and the other end is secured to a piston 20, extending out of a cylinder 21 in which it reciprocates. The cylinder 21 is provided in the usual manner with an inlet port 23 and an outlet or exhaust port 24 and with a suitable control valve 22.

It is to be understood that any single cylinder and piston mechanism wherein the cylinder has inlet and exhaust ports may be used for the purpose of operating the valve.

Figure 4:
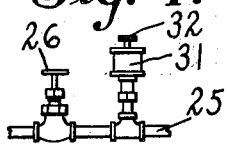
Fig. 4 is a modified form of oiler adapted for use with my improved device.

A supply pipe 25 is connected to the inlet port 23 and extends backwardly toward and into the cab of the locomotive where it is connected to a hand operable valve 26, which, in this instance, is connected by a pipe 27 to a supply of air or steam under pressure. The supply pipe 25 is interrupted before it is connected to the valve 26, and an oiler 28 is provided in the line. The oiler 28 is of the usual type having a reservoir 29 and a hand operated valve 30 by which a supply of oil may be drawn from the reservoir 29 and permitted to flow into pipe 25. If desired, an oiler such as shown in Fig. 4, may be used wherein the supply of oil is obtained from the reservoir 31, drop by drop, under control of a needle valve adjustable by the thumb screw 32.

The bearings 14 and 15 are each provided with an oil opening 33, leading to the respective trunnion 12 or 13 journaled therein. The upper ends of a pair of tubes 35 and 36 respectively overlie the openings 33 so that air or steam under pressure will be directed into these openings. The tubes 35 and 36 are extended downwardly and connected into communication with a pipe 37, which extends from the exhaust port 24 of cylinder 21.

To operate the bell 10, the engineer positioned in the cab, opens valve 26 admitting air or steam under pressure to pipe 25 and thence to cylinder 21, wherein it operates upon piston 20 to swing bell 10 through crank 18. By admitting oil into pipe 25 from reservoir 29 or 31 before valve 26 is opened, the engineer of the locomotive can lubricate the piston and cylinder, the oil being carried thereto by the air or steam flowing through pipe 25. When the cylinder 21 is exhausted through port 24 the exhaust air or steam flows through tubes 35 and 36 and from them is exhausted into the oil openings 33. The exhaust air or steam carries with it surplus oil from the cylinder 21 which is deposited in the oil openings and lubricates the bearings 14 and 15 and trunnions 12 and 13 respectively. The force of the air or steam exhausting into the oil openings blows any loose or collected dust or cinders therefrom and keeps them substantially clean and free from foreign material, whereby the deposited oil flows directly to the bearings and trunnions to lubricate them, thus insuring efficient operation of the bell-ringing device and bell.

While I have shown and described a preferred embodiment of my invention, it will be understood that it is not to be limited to all of the details shown, but is capable of modification and variation within the spirit of the invention and the scope of the appended claims.

What I claim is:

1. The combination of a swingable bell having a trunnion at each side thereof, a frame having a bearing for each trunnion, a cylinder having an inlet port and an exhaust port, a piston in said cylinder, said piston operatively connected to said bell to swing the same, a pipe connected to said inlet port, a pressure supply in connection with said pipe, a lubricant supply in connection with said pipe, and a tube extending from each bearing to and in communication with said exhaust port to direct substantially all of the exhausting material under substantially the exhausting pressure on to said bearing.

2. The combination of a swingable bell having a trunnion at each side thereof, a frame having a bearing for each trunnion, each bearing having an oil opening therein, a cylinder having an inlet port and an exhaust port, a piston in said cylinder, said piston operatively connected to said bell to swing the same, a pipe connected to said inlet port, a pressure supply in connection with said pipe, a lubricant supply in connection with said pipe, and a tube extending from each bearing to and in communication with said exhaust port to direct all of the exhausting material under substantially the exhausting pressure thereof into said bearing, the ends of said tubes being directed toward the oil openings in said bearings to direct the exhaust matter from said cylinder thereinto to violently blow out accumulations therein and to force lubricating material into said bearing.

3. The combination of a swingable locomotive bell, means to operate said bell comprising a reciprocating piston slidably mounted in a cylinder and connected to said bell to swing the same, said bell having trunnions therein journaled in bearings, said bearings being open to the atmosphere by an oil passage, said cylinder having inlet and exhaust ports, a supply pipe to direct piston operating fluid under pressure into said cylinder through said inlet port, a supply of lubricating material communicating with said supply pipe to be admitted into the stream of pressure fluid in said pipe, a pipe extending from said cylinder exhaust port to receive all the exhausting material therefrom, and a plurality of tubes communicating with and extending from said last named pipe, each tube being directed into the oil passage of one of the bearings associated with said bell to direct the exhausting material from said cylinder exhaust port into said passage at substantially the exhausting pressure to blow out accumulated foreign material therefrom and to force the entrained lubricating material through said passage into said bearing.

4. The combination of a swingable locomotive bell, bearings for said bell, means to operate said bell including a reciprocating piston slidably mounted in a cylinder and connected to said bell to swing the same, each of said bearings being open to the atmosphere by an oil passage, said cylinder having inlet and exhaust ports, a supply pipe to direct piston operating fluid under pressure into said cylinder through said inlet port, a pipe extending from said cylinder exhaust port to receive all the exhausting material therefrom, and a plurality of tubes communicating with and extending from said last named pipe, each tube being directed into the oil passage of one of the bearings associated with said bell to direct the exhausting material from said cylinder exhaust port directly into said passage from above at substantially the exhausting pressure to blow out accumulated foreign material therefrom.

5. In combination with a swingable bell having a trunnion at each side thereof, a frame having a bearing for each trunnion, each of said bearings being open at one point to form an oil passage, and means to lubricate said bearings through, and to blow out foreign matter from, the open point in each bearing, said means comprising a source of lubricant-laden fluid under pressure, and a pipe leading from said source of fluid to each of said bearings, said pipe having its open end disposed adjacent to and directed into the open point in said bearing.

6. In combination with a swingable bell having a trunnion at each side thereof, a frame having a bearing for each trunnion, each of said bearings being open at one point to form an oil passage, and means to lubricate said bearings through, and to blow out foreign matter from, the open point in each bearing, said means comprising a source of fluid under pressure, means to release said fluid to permit it to flow from its source, means to entrain a lubricant into said fluid as it flows from its source, and a plurality of pipes through which said fluid flows and by which it is guided, one of said pipes leading to each of said bearings and having its open end disposed adjacent to and directed into the open point in said bearing.

7. The combination of a locomotive bell having a trunnion on each side thereof, a bracket having bearings in which said trunnions are journaled, each of said bearings having an oil hole communicating with the journal opening therein, means to rock said bell upon its trunnions, said means including a cylinder and piston mechanism, said cylinder having an inlet and an exhaust port, means to inject a liquid lubricant into said cylinder through the inlet port thereof, and means to direct the lubricant containing exhaust material from the exhaust port of said cylinder directly and without substantial loss in pressure to the oil hole in each of said bearings.

8. The combination of a locomotive bell having a trunnion on each side thereof, a bracket having bearings in which said trunnions are journaled, each of said bearings having an oil hole communicating with the journal opening therein, means to rock said bell upon its trunnions, said means including a cylinder and piston mechanism, said cylinder having an inlet and an exhaust port, means to inject a liquid lubricant into said cylinder through the inlet port thereof, and a plurality of tubes, one leading to the oil hole in each bearing and having its open end directed toward the open end of the respective oil hole, said tubes being brought together at their other ends and disposed into communication with the exhaust port of said cylinder and being of such cross-sectional area that the exhaust material from said exhaust port will be substantially equally divided among said tubes and forced into the respective oil holes without a substantial loss in pressure thereof.

FRANK L. STALEY.